US012794638B2

(12) United States Patent
Liu et al.

(10) Patent No.: US 12,794,638 B2
(45) Date of Patent: Nov. 10, 2026

(54) SIGNAL TRANSMISSION METHOD, DEVICE, COMMUNICATION NODE, AND STORAGE MEDIUM

(71) Applicant: ZTE CORPORATION, Shenzhen (CN)

(72) Inventors: Juan Liu, Shenzhen (CN); Yajun Zhao, Shenzhen (CN); Ling Yang, Shenzhen (CN); Wei Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 434 days.

(21) Appl. No.: 17/626,471

(22) PCT Filed: Jul. 24, 2020

(86) PCT No.: PCT/CN2020/104509
§ 371 (c)(1),
(2) Date: Jan. 11, 2022

(87) PCT Pub. No.: WO2021/018041
PCT Pub. Date: Feb. 4, 2021

(65) Prior Publication Data

US 2022/0286259 A1 Sep. 8, 2022

(30) Foreign Application Priority Data

Jul. 26, 2019 (CN) ......................... 201910684543.2

(51) Int. Cl.
*H04L 5/00* (2006.01)
*H04W 72/0453* (2023.01)
*H04W 74/0833* (2024.01)

(52) U.S. Cl.
CPC ....... *H04L 5/0053* (2013.01); *H04W 72/0453* (2013.01); *H04W 74/0833* (2013.01)

(58) Field of Classification Search
CPC ... H04L 5/0053; H04L 5/0048; H04L 5/0005; H04L 5/0044; H04L 5/0035;
(Continued)

(56) References Cited

U.S. PATENT DOCUMENTS 6,891,792 B1 * 5/2005 Cimini, Jr. .......... H04L 27/2679 375/280
7,535,950 B2 * 5/2009 Chen ...................... H04B 1/707 375/141
(Continued)

FOREIGN PATENT DOCUMENTS

CN 101860395 A 10/2010
CN 108307506 A 7/2018
(Continued)

OTHER PUBLICATIONS

Office Action for Japanese Application No. 2022-504735, dated Feb. 14, 2023, 8 pages including English translation.
(Continued)

*Primary Examiner* — Thuong Nguyen
(74) *Attorney, Agent, or Firm* — Morgan, Lewis & Bockius LLP

(57) ABSTRACT

Provided are a signal transmission method and device, a communication node and a storage medium. The method includes steps described below, a configuration manner of sequences is determined, where the configuration manner includes at least one of the number of the sequences, a length of the sequences, or a phase rotation angle of an element in one of the sequences; the sequences are generated according to the configuration manner; and the sequences are mapped to channel resources and the mapped sequences are transmitted.

15 Claims, 6 Drawing Sheets

(58) Field of Classification Search
CPC ... H04L 5/0051; H04L 5/0094; H04L 5/0007; H04W 72/0453; H04W 74/0833; H04W 72/0433; H04W 72/042; H04W 72/0413; H04W 72/0409; H04W 72/1263; H04W 72/04; H04W 4/005
USPC .......................................................... 370/329
See application file for complete search history.

(56) References Cited

U.S. PATENT DOCUMENTS 9,065,649 B2 6/2015 Kim et al.
10,903,953 B2 1/2021 Wu et al.
11,483,806 B2 10/2022 Matsumura et al.
2008/0240285 A1* 10/2008 Han ...................... H04L 5/0066 375/295
2009/0135925 A1* 5/2009 Hamaguchi ......... H04L 25/0226 375/260
2011/0222519 A1* 9/2011 Liao .................... H04L 27/2626 370/338
2012/0087428 A1* 4/2012 Martinez ............... H04L 25/022 375/295
2012/0314743 A1* 12/2012 Yoon ................... H04L 27/2613 375/295
2013/0028138 A1* 1/2013 Hao ...................... H04L 5/0092 370/254
2013/0315342 A1* 11/2013 Um ..................... H04L 27/2675 375/295
2014/0029602 A1* 1/2014 Han ...................... H04L 7/0087 370/350
2015/0049685 A1* 2/2015 Chen ..................... H04L 5/0053 370/329
2015/0156760 A1* 6/2015 Yu ..................... H04W 72/0446 370/329
2017/0187557 A1* 6/2017 Zhang ................. H04L 27/2655
2017/0202028 A1* 7/2017 Gaal ................. H04W 72/0453
2019/0044683 A1* 2/2019 Wu ..................... H04L 27/2646
2019/0081839 A1 3/2019 Qu et al.
2019/0141700 A1* 5/2019 Kwak ................... H04L 5/0026
2019/0159153 A1* 5/2019 Li ........................... H04L 27/26
2019/0229971 A1* 7/2019 Zhang ................. H04L 27/2666
2019/0273584 A1* 9/2019 Kazmi ................ H04L 27/2666
2019/0349109 A1* 11/2019 Qu .......................... H04J 13/12
2020/0022148 A1* 1/2020 Tang ..................... H04L 5/0094
2020/0045691 A1* 2/2020 Park ...................... H04L 5/0053
2020/0067621 A1* 2/2020 Hu ...................... H04J 13/0062
2020/0068617 A1* 2/2020 Yoon ................. H04W 74/0833
2020/0178315 A1 6/2020 Li et al.
2020/0186311 A1* 6/2020 Xu ........................ H04L 5/0007
2020/0236716 A1* 7/2020 Lei ........................ H04L 5/0051
2020/0252172 A1* 8/2020 Xi ..................... H04L 27/26134
2020/0275392 A1* 8/2020 Tang ..................... H04W 72/53
2020/0280915 A1* 9/2020 Lu ............................. H04L 5/16
2020/0287762 A1* 9/2020 Qu ...................... H04L 27/2614
2021/0014694 A1* 1/2021 Li ....................... H04L 27/2613
2021/0084604 A1* 3/2021 Xu ...................... H04W 56/001
2021/0120614 A1* 4/2021 Lu ......................... H04W 76/15
2021/0160024 A1* 5/2021 Gao .................... H04L 27/2678
2021/0298025 A1* 9/2021 Wang .................... H04L 5/0053
2022/0104153 A1* 3/2022 Ko ........................ H04W 56/00
2022/0217543 A1* 7/2022 Murayama ............ H04L 5/0044
2022/0286259 A1* 9/2022 Liu ....................... H04L 5/0048

FOREIGN PATENT DOCUMENTS

CN 109392129 A 2/2019
CN 109429337 A 3/2019
CN 109510693 A 3/2019
CN 109802792 A 5/2019
CN 110535613 A 12/2019
CN 111092703 A 5/2020
WO WO2017/166902 A1 10/2017
WO WO2018/147692 A1 8/2018
WO WO-2018202130 A1 11/2018
WO WO-2018212618 A1 11/2018
WO WO-2018143394 A1 3/2019
WO WO-2019139426 A1 7/2019

OTHER PUBLICATIONS

Supplementary Partial European Search Report Application No. 20846778.7, dated Dec. 20, 2023, 22 pages.
International Search Report for Application No. PCT/CN2020/104509, dated Oct. 23, 2020, 4 pages including English translation.
Extended European Search Report Application No. 20846778.7, dated Apr. 11, 2024, 28 pages.
Chinese Office Action of Application No. 201910684543.2, dated Apr. 25, 2024, 12 pages including translation.
Chinese Search Report of Application No. 201910684543.2, dated Apr. 25, 2024, 6 pages including translation.
Panasonic, "NR-U PRACH design", 3GPP TSG RAN WG1 #96bis, R1-1904593, Xi'an, China, Apr. 8-12, 2019.
LTE, "Evolved Universal Terrestrial Radio Access (E-UTRA); Physical channels and modulation", 3GPP TS 36.211 version 10.2.0 Release 10, Jun. 2011.
First Office Action in Korean Application No. 10-2022-7001435, dated Jan. 5, 2025, 11 pages, including translation.
Huawei et al. "UL PHY channels for NR unlicensed", 3GPP TSG RAN WG1 Meeting #94, R1-1808060, Gothenburg, Sweden, Aug. 20-Aug. 24, 2018.
Intel Corporation. "Initial access signals/channels for NR-unlicensed", 3GPP TSG RAN WG1 Meeting #97, R1-1906782, Reno, Nevada, USA, May 13-17, 2019.
Qualcomm Incorporated. "Feature lead summary on initial access signals and channels for NR-U", 3GPP TSG RAN WG1 Meeting #97, R1-1907883, Reno, USA, May 13-May 17, 2019.

* cited by examiner

SIGNAL TRANSMISSION METHOD, DEVICE, COMMUNICATION NODE, AND STORAGE MEDIUM

CROSS-REFERENCE TO RELATED APPLICATIONS

This is a National Stage Application, filed under 35 U.S.C. 371, of International Patent Application No. PCT/CN2020/104509, filed on Jul. 24, 2020, which claims priority to Chinese Patent Application No. 201910684543.2, filed with the China National Intellectual Property Administration (CNIPA) on Jul. 26, 2019, disclosures of which is are incorporated herein by reference in their entireties.

TECHNICAL FIELD

The present application relates to the field of communications, and for example, to a signal transmission method and device, a communication node and a storage medium.

BACKGROUND

In the system design of the fifth generation mobile communication technologies (5G, 5th generation mobile networks or 5th generation wireless systems), for an unlicensed frequency band, a new sequence or a transmission sequence or a channel transmission sequence or a transmission structure of signal transmission needs to be designed due to requirements of a signal occupying a frequency domain bandwidth. There is no clear manner of how to make a new design works effectively.

SUMMARY

Embodiments of the present application provide the following schemes.

An embodiment of the present application provides a signal transmission method. The signal transmission method includes the following, a configuration manner of sequences is determined, where the configuration manner includes at least one of the number of the sequences, the length of the sequences, or a phase rotation angle of an element in the sequences; the sequences are generated according to the configuration manner; and the sequences are mapped to channel resources and the mapped sequences are transmitted.

An embodiment of the present application provides a signal transmission device. The signal transmission device includes a determination module, a generation module and a mapping and transmission module. The determination module is configured to determine a configuration manner of sequences, where the configuration manner includes at least one of a number of the sequences, a length of the sequences, or a phase rotation angle of an element in the sequences. The generation module is configured to generate the sequences according to the configuration manner. The mapping and transmission module is configured to map the sequences to channel resources and transmit the mapped sequences.

An embodiment of the present application provides a communication node for a signal transmission. The communication node includes a processor and a memory. The memory is configured to store an instruction. The processor is configured to read the instruction to perform any of the embodiments of the signal transmission method described above.

An embodiment of the present application provides a storage medium. The storage medium stores a computer program, and the computer program, when executed by a processor, implements any of the methods in the embodiments of the present application.

In the signal transmission method provided in the embodiments of the present application, the sequence is generated according to the configuration manner, and the sequence is mapped and transmitted, so as to transmit a signal by using a new sequence transmission structure.

DETAILED DESCRIPTION

Hereinafter, embodiments of the present application will be described in detail in conjunction with the accompanying drawings. It should be noted that, in the present application, the embodiments and the features of the embodiments may be arbitrarily combined without conflict.

Figure 1:
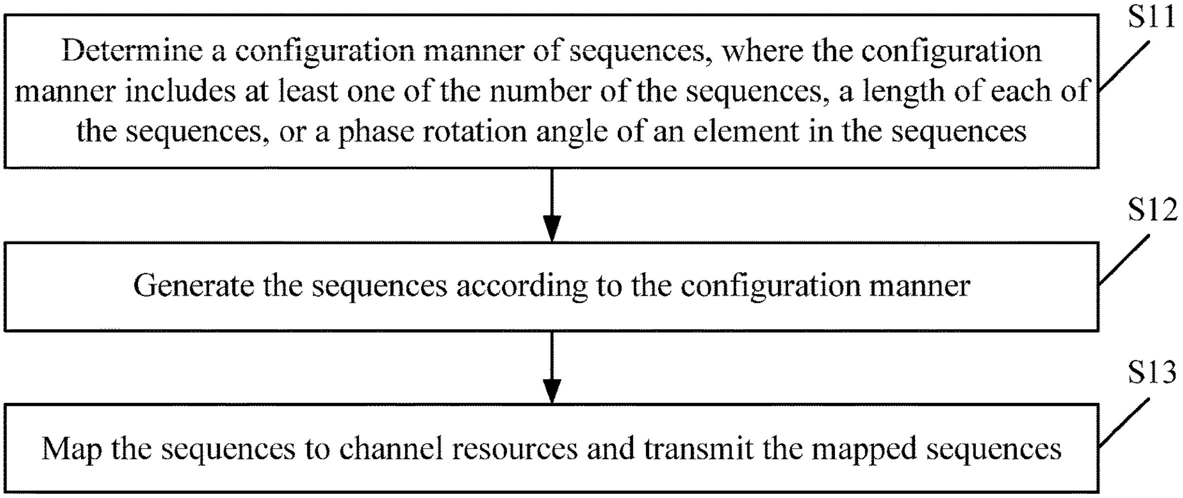
FIG. 1 is a flowchart for implementing a signal transmission method according to an embodiment of the present application.

An embodiment of the present application provides a signal transmission method, and FIG. 1 is a flowchart for implementing a signal transmission method according to an embodiment of the present application, the method includes the following.

In S11, a configuration manner of sequences is determined. The configuration manner includes at least one of the number of the sequences, the length of the sequences, or a phase rotation angle of an element in the sequences.

In S12, the sequences are generated according to the configuration manner.

In S13, the sequences are mapped to channel resources and the mapped sequences are transmitted.

The above configuration manner may refer to a feasible or appropriate configuration manner.

It should be noted that the “the phase rotation angle of the element in the sequences” is one of the following: a phase rotation angle of each element in the sequences relative to an element which corresponds to the each element and is in an initial sequence; or a phase rotation angle of each element in the sequences relative to an element which corresponds to the each element and is in one of other sequences, where the other sequences are any other sequences except the one sequence in a signal.

Thus, the "phase rotation angle of the element in the sequences" included in the above-described configuration manner may include at least one of the following information:

1) an overall phase relationship among multiple sequences;
2) a phase relationship between elements within each sequence;
3) an overall phase relationship of each sequence relative to the initial sequence;
4) an overall phase relationship of each sequence relative to other sequences; for example, an overall phase relationship of each sequence relative to the first sequence or an adjacent sequence;
5) a phase relationship of each element within each sequence relative to a respective element of the initial sequence;
6) a phase relationship of an element of each sequence relative to a respective element in a sequence obtained by performing a corresponding operation on the initial sequence; and
7) an overall phase relationship of each sequence relative to a sequence obtained by performing a corresponding operation on the initial sequence.

It should be noted that the "initial sequence" is a sequence generated according to a certain rule, or a sequence obtained by performing a corresponding operation on the generated sequence, or a predefined sequence.

It should be noted that the "corresponding operation" refers to, but is not limited to, the cyclic shift, the phase rotation, and the like.

In one possible implementation, the above configuration manner further includes at least one of a frequency domain starting position, a frequency domain offset value, or a frequency domain spacing between different sequences. Mapping the sequences to the channel resources includes that the sequences are mapped to the channel resource according to at least one of the frequency domain starting position, the frequency domain offset value, or the frequency domain spacing between different sequences.

In one possible implementation, mapping the sequences to the channel resources includes one of: the generated sequences are mapped to all or part of frequency domain resources of any interlace of the channel resources; or the generated sequences are mapped to all or part of frequency domain resources of multiple interlaces of the channel resources. The frequency domain resources are one of M1 data subcarriers, 1/M1 data subcarrier, M1 random access channel (RACH) subcarriers, 1/M1 RACH subcarrier, M1 resource blocks (RBs), or 1/M1 RB; where M1 is a positive integer, and / represents division.

In one possible implementation, the frequency domain starting position, the frequency domain offset value, or the frequency domain spacing between the different sequences is informed by control signaling, or predefined a combination for a communication node to select, or pre-stored in a communication node and triggered by control signaling, or informed by a control channel, or configured by a higher layer.

The number of sequences, the length of the sequences, or the phase rotation angle of the element in the sequences is determined in the following manners: informing by control signaling, predefining a combination for a communication node to select, pre-storing in a communication node and triggering by control signaling, informing by a control channel, or configuring by a higher layer.

The manner of informing by the control signaling may include at least one of the following: informing indication information of the information by the control signaling, and determining the information by the communication node receiving the control signaling according to the indication information; or directly informing the information by the control signaling.

In one possible implementation, the precision of the frequency domain starting position is one of H1 data subcarriers, or 1/H1 data subcarrier, H1 random access channel (RACH) subcarriers, 1/H1 RACH subcarrier, H1 RBs, or 1/H1 RB; where H1 is a positive integer, and / represents division.

The precision of the frequency domain offset value is one of H2 data subcarriers, 1/H2 data subcarrier, H2 RACH subcarriers, 1/H2 RACH subcarrier, H2 RBs, or 1/H2 RB; where H2 is a positive integer, and / represents division.

The precision of the frequency domain spacing between the different sequences is one of H3 data subcarriers, 1/H3 data subcarrier, H3 RACH subcarriers, 1/H3 RACH subcarrier, H3 RBs, or 1/H3 RB; where H3 is a positive integer, and / represents division.

In one possible implementation, the length of one of the sequences is 6, 12, 18, 24, 139, 283, 571, 1151, or any number less than a product of H4 and one of the number of RACH subcarriers or the number of available data subcarriers in a system; where H4 is a positive integer.

In one possible implementation, the frequency domain offset value is 0 or a positive integer.

In one possible implementation, the frequency domain offset value is 0 or less than or equal to the length of the sequences.

In one possible implementation, in the case where the length of one of the sequences is 139, 283, or 571, the frequency domain offset value is 0, 1, 2, 3, 4, or 5; in the case where the length of one of the sequences is 1151, the frequency domain offset value is 0 or 1; in the case where the length of one of the sequences is 6, 18, or 24, the frequency domain offset value is 0, 1, 2, 3, 4, 5, or 6; and in the case where the length of one of the sequences is 12, the frequency domain offset value is 0 or 1.

In one possible implementation, the phase rotation angle of the element in the sequences is one of the following: a phase rotation angle of each element in the sequences relative to an element which corresponds to the each element and is in an initial sequence; or a phase rotation angle of each element in the sequences relative to an element which corresponds to the each element and is in one of other sequences, where the other sequences are sequences except the one sequence in a signal.

In one possible implementation, the initial sequence is one of a sequence generated according to a predetermined rule, or a sequence obtained by performing a corresponding operation on the generated sequence, or a predefined sequence.

In one possible implementation, in the case where the number of sequences is 2 or more, each sequence corresponds to the same or different initial sequence.

In one possible implementation, the configuration manner includes the number of sequences being 1, and the phase rotation angle of each element in the sequence; where the phase rotation angle of each element is the same or different.

In one possible implementation, the configuration manner includes the number of sequences being 2 or more, and a phase rotation angle of each element in each sequence; where phase rotation angles of each element in the same sequence are the same or different; and phase rotation angles of elements in different sequences are the same or different.

In one possible implementation, the configuration manner includes the number of sequences being 2; a frequency domain starting position of the first sequence of the two sequences and a frequency domain offset value of each of the two sequences; and one of a frequency domain spacing between different sequences or a frequency domain starting position of the second sequence of the two sequences.

In one possible implementation, the configuration manner includes the number of sequences being more than one; a frequency domain starting position of the first sequence of the more than one sequence and a frequency domain offset value of each of the more than one sequence; and a frequency domain spacing between adjacent ones of the more than one sequence.

In one possible implementation, the configuration manner includes the number of sequences being more than one; and a frequency domain starting position and a frequency domain offset value of each of the more than one sequence.

In one possible implementation, the configuration manner includes the number of sequences being more than one; a frequency domain starting position of the first sequence of the more than one sequence and a frequency domain offset value of each of the more than one sequence; and one of frequency domain starting positions of other sequences except the first sequence, or frequency domain spacings of other sequences except the first sequence relative to the first sequence, or frequency domain spacings between a specified sequence and other sequences except the first sequence.

In one possible implementation, the configuration manner includes the number of sequences being 2 or more; and the length of the at least two sequences; where lengths of the at least two sequences are the same or different.

Several alternative configuration manners are described below in terms of exemplary embodiments.

Embodiment One

The number of sequences is 2, and the communication node determines at least one of a frequency domain starting position of each sequence, a frequency domain offset value of each sequence, or a frequency domain spacing between different sequences.

A manner in which the communication node determines the at least one of the frequency domain starting position of each sequence, the frequency domain offset value of each sequence, or the frequency domain spacing between different sequences may be informing by control signaling, predefining a combination for a communication node to select, pre-storing in a communication node and triggering by control signaling, informing by a control channel, or configuring by a higher layer.

The communication node may be a base station or a terminal.

In an exemplary disclosure, the two sequences have the same length and correspond to the same initial sequence; alternatively, the two sequences may correspond to different sequences obtained by different cyclic shifts of the same initial sequence; or, the two sequences may correspond to different initial sequences; alternatively, there may be a certain phase relationship between the two sequences, or a certain phase relationship between multiple elements within one sequence.

In an exemplary disclosure, the two sequences may be composed in several manners: the two sequences are composed of the same initial sequence; one sequence is a sequence obtained by rotating the phase of each element of the other sequence by the same angle (that is, rotating an overall phase of the sequence by a certain angle); or, one sequence is a sequence obtained by rotating the phase of each element of the other sequence by different angles; or, one sequence is a sequence obtained by rotating the phase of each element in the initial sequence by the same angle, and the other sequence is a sequence obtained by rotating the phase of each element in the initial sequence by different angles.

It should be noted that in the "rotating the phase of each element by different angles", the phase rotation angle of each element may have a certain phase relationship.

In an exemplary disclosure, the phase rotation angle has a gradually rising trend; or, the phase rotation angle has a gradually decreasing trend.

Figure 2A:
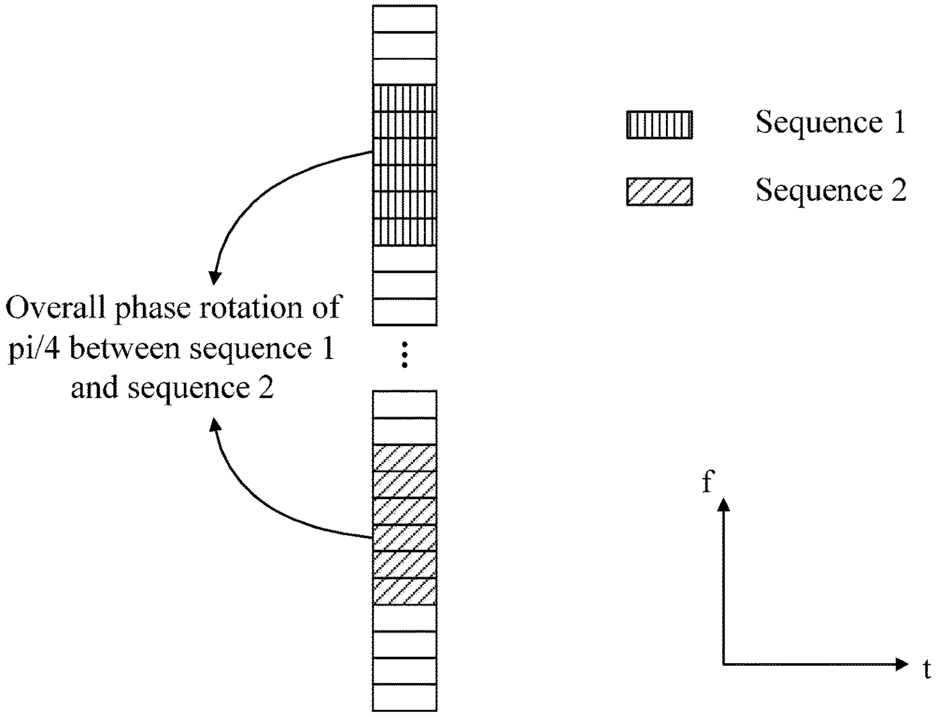
FIG. 2A is a schematic diagram showing an overall phase rotation of pi/4 between sequence 1 and sequence 2.

FIG. 2A is a schematic diagram showing an overall phase rotation of pi/4 between sequence 1 and sequence 2.

Figure 2B:
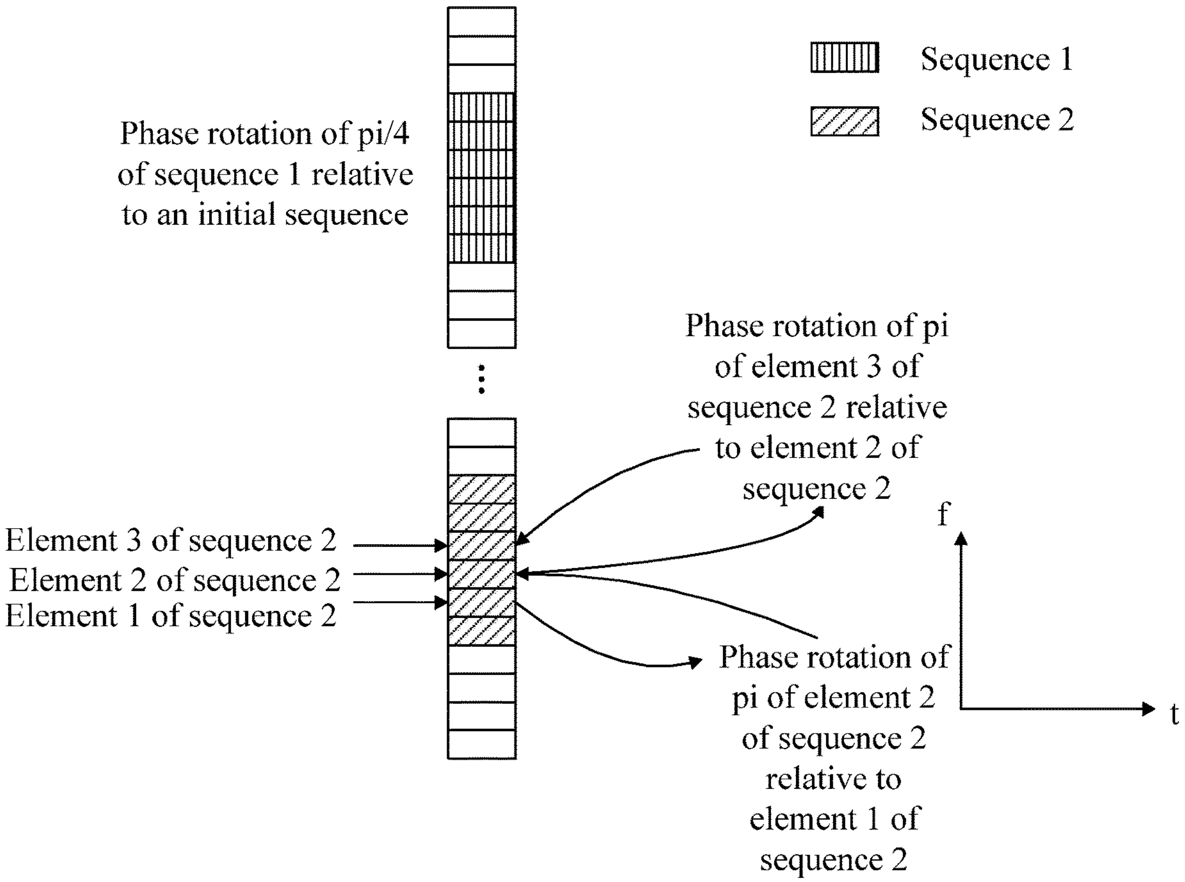
FIG. 2B is a schematic diagram showing a phase rotation of pi/4 of sequence 1 relative to an initial sequence and a certain phase relationship between elements in sequence 2.

FIG. 2B is a schematic diagram showing a phase rotation of pi/4 of sequence 1 relative to an initial sequence and a certain phase relationship between elements in sequence 2. In FIG. 2B, there is a phase offset of pi/2 between each element in sequence 2.

Figure 2C:
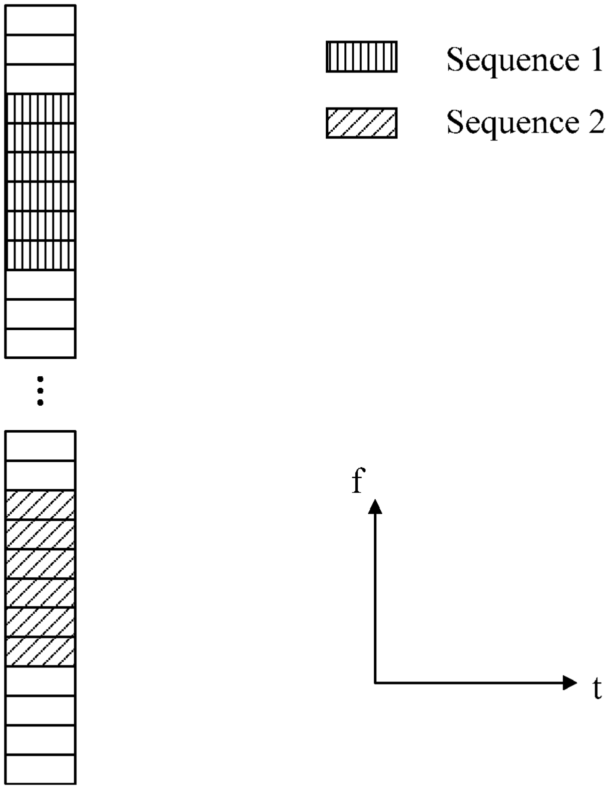
FIG. 2C is a schematic diagram showing sequence 1 and sequence 2 corresponding to different initial sequences, or sequence 1 and sequence 2 corresponding to sequences obtained by performing cyclic shift on different initial sequences.

FIG. 2C is a schematic diagram showing sequence 1 and sequence 2 corresponding to different initial sequences, or corresponding to sequences obtained by performing the cyclic shift on different initial sequences. In FIG. 2C, there is no phase relationship between the two sequences.

There are two sequences in each of FIG. 2A, FIG. 2B, and FIG. 2C.

It should be noted that the two sequences described above corresponding to the same initial sequence may represent that the two sequences are generated by the same initial sequence. The generation manner may include: being equivalent to the initial sequence, rotating the phase of each element in the initial sequence by the same angle, or rotating the phase of each element in the initial sequence by different angles.

The two sequences described above corresponding to different sequences obtained by performing the cyclic shift on the same initial sequence may represent that the two sequences are generated from different initial sequences, respectively, and these different initial sequences described above are sequences obtained by performing the cyclic shift on the same sequence, or these different initial sequences are equivalent to the sequence. The generation manner may include: being equivalent to the sequence, rotating the phase of each element in the sequence by the same angle, or rotating the phase of each element in the sequence by different angles. In addition, the two sequences corresponding to different initial sequences obtained by performing the cyclic shift on the same sequence may also be referred to as the two sequences consisting of the same sequence.

The above description is given by using an example of two sequences. The meaning of multiple sequences corresponding to the same initial sequence or multiple sequences corresponding to different initial sequences obtained by performing the cyclic shift on the same sequence is similar to the above meaning and not repeated here.

The above description applies to other embodiments of the present application.

In one possible implementation, the communication node informs, through the control signaling, another communication node of at least one of the frequency domain starting position of the sequence, the frequency domain offset value of the sequence, or the frequency domain spacing between different sequences.

The precision (or referred to as unit) of the frequency domain starting position is one of H1 data subcarriers, 1/H1 data subcarrier, H1 RACH subcarriers, 1/H1 RACH subcarrier, H1 RBs, or 1/H1 RB; where H1 is a positive integer, and / represents division.

The precision (or referred to as unit) of the frequency domain offset value is one of H2 data subcarriers, 1/H2 data subcarrier, H2 RACH subcarriers, 1/H2 RACH subcarrier, H2 RBs, or 1/H2 RB; where H2 is a positive integer, and / represents division.

The precision (or referred to as unit) of the frequency domain spacing between different sequences is one of H3 data subcarriers, 1/H3 data subcarrier, H3 RACH subcarriers, 1/H3 RACH subcarrier, H3 RBs, or 1/H3 RB; where H3 is a positive integer, and / represents division.

In one configuration manner of the sequences, the frequency domain starting position and the frequency domain offset value of each sequence, or the frequency domain starting position and the frequency domain offset value of one of the sequences and the spacing between the two sequences may also be included except the number of sequences, the length of the sequences, or the phase rotation angle of each element in each sequence.

It should be noted that frequency domain offset values of the two sequences may be the same or different. In the case where the frequency domain offset values of the two sequences are different, the configuration manner of the above sequences may further include the frequency domain offset value of the other sequence.

It should be noted that the spacing between the two sequences may be a distance between starting point positions of the two sequences; or a distance between final positions of the two sequences; or a distance between one end of one sequence and the other end of the other sequence. The spacing between the two sequences may be determined by the communication node in the following manners: informing by control signaling, predefining a combination for a communication node to select, pre-storing in a communication node and triggering by control signaling, informing by a control channel, or configuring by a higher layer.

When the length of the sequences is 139, the corresponding frequency domain offset value length may be one of {0, 1, 2, 3, 4, 5}. Two sequences with the length 139 may be mapped to both ends of the entire frequency domain, and may correspond to different frequency domain offset values, respectively, or the same frequency domain offset value.

Embodiment Two

The number of sequences transmitted by the communication node is S, corresponding lengths of the sequences are A1, A2, . . . , and AS, respectively; corresponding frequency domain offset values of the sequences are K1, K2, . . . , and KS, and the sequences are correspondingly transmitted through a certain mapping rule and in an equal spacing or unequal spacing manner, where S, A1, A2, . . . , AS, K1, K2, . . . , and KS are nonnegative integers, K1<=A1, K2<=A2, . . . , KS<=AS, where <= represents less than or equal to. The number of corresponding frequency domain offset values of the sequences is less than or equal to S, and the number of the corresponding lengths of the sequences is less than or equal to S.

A phase rotation of C exists between a phase rotation angle of an element in each sequence and a phase rotation angle of an element in the specified sequence, and the value range of C is 0 to 360°.

The communication node may be a base station or a terminal.

X frequency domain units 1 are in the system, the spacing of sequences is Y frequency domain units 2, the system includes Z spacings, and the sequences are transmitted by occupying H frequency domain starting positions; where H positions are arbitrary.

X, Y, Z, and H are all positive integers, and H<=Z.

The H positions may be equally spaced, or occupied at both ends, or occupied in the middle.

The H positions may be equally spaced so that the mapping of the sequences in the frequency domain is consecutive.

The frequency domain unit 1 and the frequency domain unit 2 may each have the unit of one of K1 data subcarriers, 1/K1 data subcarrier, K2 RACH subcarriers, 1/K2 RACH subcarrier, K3 RBs, or 1/K3 RB, where K1, K2 and K3 are positive integers, and / represents division.

The system may contain 51 RBs at spacings of 5 RBs (the spacing of each sequence starting point position), and the system may contain 10 spacings (50 consecutive RBs).

In an exemplary disclosure, one sequence has the length of 12 and occupies 12 data subcarriers/REs (subcarriers and resource elements (REs) are equivalent, 12 REs may be considered as one RB), the number of transmitted sequences is 10, each sequence corresponds to the same frequency domain offset value of 0 (less than the length 12 of the sequence), the phase rotation angle of the element in the sequence is 0, and over 10 transmittable opportunities, RBs having any number of less than or equal to 10 RBs are occupied for mapping the sequences and transmitting the sequences.

In an exemplary disclosure, the sequences are equally spaced and there may be a certain cyclic shift or a phase rotation or other variation among the sequences.

In an exemplary disclosure, the available RBs in the frequency domain may be divided into 5 interlaces, where RB indexes contained in the first interlace are a set of {1, 6, 11, 16, 21, 26, 31, 36, 41, 46}; RB indexes contained in the second interlace are a set of {2, 7, 12, 17, 22, 27, 32, 37, 42, 47}; RB indexes contained in the third interlace area set of {3, 8, 13, 18, 23, 28, 33, 38, 43, 48}; RB indexes contained in the fourth interlace are a set of {4, 9, 14, 19, 24, 29, 34, 39, 44, 49}; and RB indexes contained in the fifth interlace are a set of {5, 10, 15, 40, 25, 40, 35, 40, 45, 50}.

The above sequences may be mapped in all or part of RBs of any interlace.

The above RB indexes may correspond to frequency domain starting positions of 10 sequences.

In an exemplary disclosure, the RB indexes occupied by the sequences are elements in the set of {1, 6, 11, 16, 21, 26, 31, 36, 41, 46}; or the set of {2, 7, 12, 17, 22, 27, 32, 37, 42, 47}; or the set of {3, 8, 13, 18, 23, 28, 33, 38, 43, 48}; or the set of {4, 9, 14, 19, 24, 29, 34, 39, 44, 49}; or the set of {5, 10, 15, 40, 25, 40, 35, 40, 45, 50}; or the set of {5, 50}; or the set of {5, 15}; or the set of {4, 9}; or the set of {1, 41}; or the set of {1, 45}. However, it is not limited to the above combinations. In the embodiments of the present application, the above sequences may be mapped to any combination of available RBs.

Embodiment Three

The number of sequences is more than one. A mapping manner of the sequences in the frequency domain is determined through the frequency domain starting position, the frequency domain offset value and the frequency domain spacing (optional) between different sequences included in the above configuration manner.

Due to the requirement of an occupied channel bandwidth (OCB), the number of sequences is related to the subcarrier spacing and the bandwidth.

In an exemplary disclosure, in the case where the bandwidth is 20 MHz and the length of the sequences is 139, when the subcarrier spacing is 30 KHz, the number x of sequences is 1<x<=4; when the subcarrier spacing is 15 KHz, the number x of sequences is 1<x<=8; in the case where the bandwidth is 40 MHz and the length of each of the sequences is 139, when the subcarrier spacing is 30 KHz, the number of sequences is 1<x<=8; when the subcarrier spacing is 15 KHz, the number x of sequences is 1<x<=16; and in the case where the bandwidth is 80 MHz and the length of each of the sequences is 139, when the subcarrier spacing is 30 KHz, the number x of sequences is 1<x<=16; when the subcarrier spacing is 15 KHz, the number x of sequences is 1<x<=32.

Where '<' represents less than; '<=' represents less than or equal to.

The multiple sequences may have the same length and correspond to the same initial sequence, or the multiple sequences may correspond to different initial sequences obtained by performing the cyclic shift on the same sequence.

The initial sequence is a sequence generated by a certain rule, or a sequence obtained by performing a corresponding operation on the generated sequence, or a predefined sequence.

It should be noted that the "corresponding operation" refers to, but is not merely limited to, a cyclic shift, a phase rotation, and the like.

In an exemplary disclosure, when the number of sequences is 4, the four sequences may correspond to 1, 2, 3, or 4 initial sequences; when the number of sequences is 8, the 8 sequences may correspond to 1, 2, 3, 4, 5, 6, 7, or 8 initial sequences; and there may be a certain phase relationship among multiple sequences to ensure that a cubic metric (CM) value is at a relatively low level, but not limited to this.

In an exemplary disclosure, each sequence may be one of the following: an initial sequence; a sequence obtained by rotating the phase of each element in the initial sequence by the same angle (that is, rotating an overall phase of the initial sequence by a certain angle); or a sequence obtained by rotating the phase of each element in the initial sequence by different angles.

It should be noted that in the "rotating the phase of each element by different angles", the phase rotation angle of each element may have a certain phase relationship.

In an exemplary disclosure, in the "rotating the phase of each element by different angles", the phase rotation angle has a gradually rising trend; or the phase rotation angle has a gradually decreasing trend.

Figure 3:
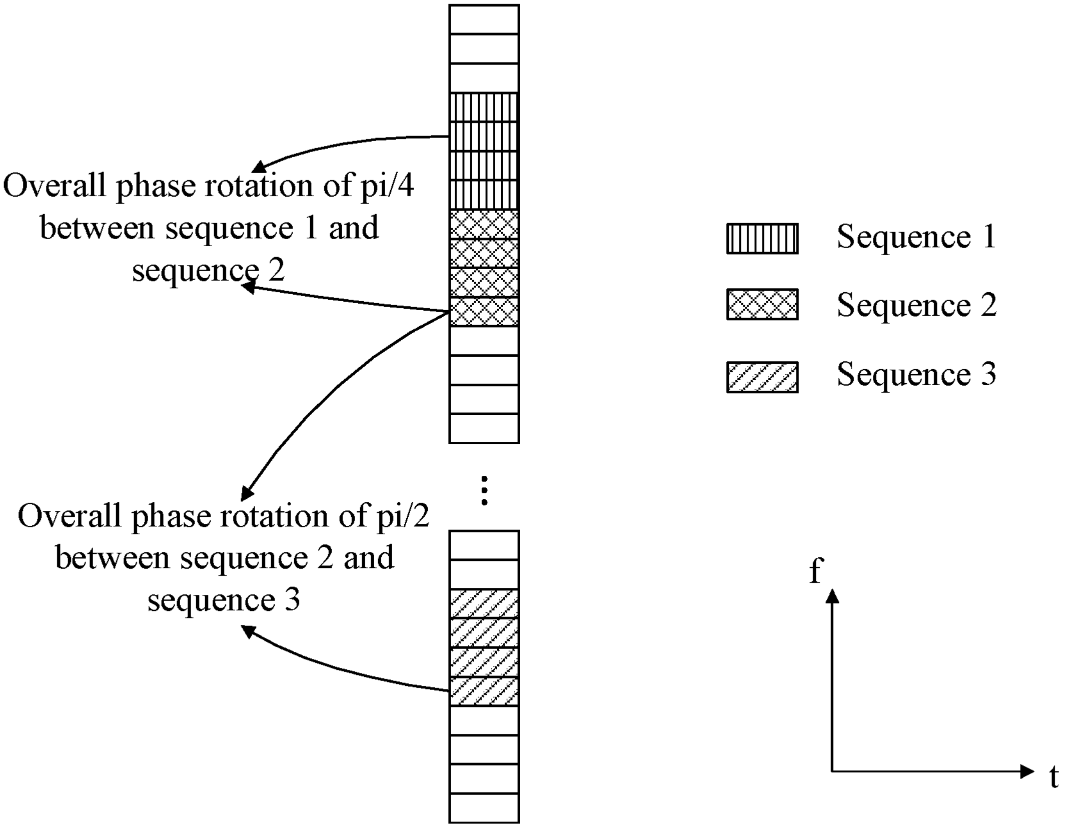
FIG. 3 is a schematic diagram showing an overall phase rotation of pi/4 between sequence 1 and sequence 2 and an overall phase rotation of pi/2 between sequence 2 and sequence 3.

FIG. 3 is a schematic diagram showing an overall phase rotation of pi/4 between sequence 1 and sequence 2 and an overall phase rotation of pi/2 between sequence 2 and sequence 3. In FIG. 3, there are three sequences, and the three sequences correspond to the same initial sequence or different initial sequences obtained by performing the cyclic shift on the same sequence.

The communication node informs, through the control signaling, another communication node of at least one of the frequency domain starting position of the sequence, the frequency domain offset value of the sequence, or the frequency domain spacing between different sequences.

The precision (or referred to as unit) of the frequency domain starting position is one of H1 data subcarriers, 1/H1 data subcarrier, H1 random access channel (RACH) subcarriers, 1/H1 RACH subcarrier, H1 RBs, or 1/H1 RB; where H1 is a positive integer, and / represents division.

The precision (or referred to as unit) of the frequency domain offset value is one of H2 data subcarriers, 1/H2 data subcarrier, H2 RACH subcarriers, 1/H2 RACH subcarrier, H2 RBs, or 1/H2 RB; where H2 is a positive integer, and / represents division.

The precision (or referred to as a unit) of the frequency domain spacing between different sequences is one of H3 data subcarriers, 1/H3 data subcarrier, H3 RACH subcarriers, 1/H3 RACH subcarrier, H3 RBs, or 1/H3 RB; where H3 is a positive integer, and / represents division.

In an exemplary disclosure, the sequences are mapped consecutively in the frequency domain; or the sequences are mapped at equal spacings in the frequency domain; or the sequences are mapped at non-equally spacings in the frequency domain.

If the sequences are mapped consecutively in the frequency domain, the configuration manner of the sequences may include the frequency domain starting position of the first sequence without frequency domain starting positions of subsequent sequences and the frequency domain spacing between sequences.

In an exemplary disclosure, in one configuration manner of the sequences, the frequency domain starting position and the frequency domain offset value of the first sequence, and frequency domain offset values of other sequences may also be included except the at least one of the number of sequences, the length of the sequences, or the phase rotation angle of the element in the sequences.

If the sequences are mapped at equal spacings in the frequency domain, the configuration manner of the sequences may include the frequency domain starting position of the first sequence and the frequency domain spacing between two adjacent sequences. Alternatively, the configuration manner of the sequences may further include the frequency domain starting position of each sequence.

In an exemplary disclosure, in one configuration manner of the sequences, the frequency domain starting position and the frequency domain offset value of the first sequence, the frequency domain spacing between sequences, and frequency domain offset values of other sequences may also be included except at least one of the number of sequences, the length of the sequences, or the phase rotation angle of the element in the sequences.

If the sequences are mapped at unequal spacings in the frequency domain, the configuration manner of the sequences may include the frequency domain starting position of the first sequence and the frequency domain spacings of other sequences relative to the previous sequence. Herein, the previous sequence may refer to a previous sequence, previous multiple, the first sequence, or the like. Alternatively, the configuration manner of the sequences may further include the frequency domain starting position of each sequence. Alternatively, in the configuration manner of the sequences, mapping positions of part of the sequences are represented by the frequency domain starting positions, and mapping positions of the other part of sequences are represented by the frequency domain spacings relative to the previous sequence.

In an exemplary disclosure, in one configuration manner of the sequences, the frequency domain starting position and the frequency domain offset value of the first sequence, a frequency domain offset value of the second sequence and a frequency domain spacing of the second sequence relative to the first sequence, a frequency domain offset value of the third sequence and a frequency domain spacing of the third sequence relative to the second sequence, . . . , up to a frequency domain offset value of the last sequence and the frequency domain spacing of the last sequence relative to the previous sequence may also be included except at least one of the number of sequences, the length of the sequences, or the phase rotation angle of each element in each sequence.

It should be noted that the frequency domain offset value of each sequence may be the same or different.

In an exemplary disclosure, when the length of one of the sequences is 139, the corresponding frequency domain offset value is one of {0, 1, 2, 3, 4, 5}.

It should be noted that the spacing between two sequences may be a distance between starting point positions of the two sequences; or a distance between final positions of the two sequences; or a distance between one end of one sequence and the other end of the other sequence. The spacing between the two sequences may be determined by the communication node in the following manners: informing by control signaling, or predefining a combination for a communication node to select, or pre-storing in a communication node.

Embodiment Four

The number of sequences is 1. The length of the sequence may be any number less than a product of H4 and one of the number of RACH subcarriers or the number of available data subcarriers, where H4 is a positive integer, that is, the length of the sequence is different from the length of the sequence in a set of {139, 839} in the long term evolution (LTE) technology and new radio (NR) technology. For example, the length of the sequence may be 12, 18, 24, 36, 283, 571, or 1151.

The communication node may select different sequence lengths at different moments.

Multiple sequence lengths may be supported by the same communication node.

The communication node may be multiplexed with data information while transmitting a relatively long sequence.

The communication node may transmit sequences with the same length or different lengths in different spatial directions at the same moment.

The communication node may transmit sequences with the same length or different lengths in different spatial directions at different moments.

In one configuration manner of the sequence, the frequency domain starting position and the frequency domain offset value of the sequence may be included except the length of the sequence.

The above communication node may be a base station or a terminal device.

In an exemplary disclosure, the sequence with a length of 12 may be mapped to one RB, the sequence with a length of 283 may be mapped to 24 RBs, the sequence with a length of 571 may be mapped to 48 RBs, and the sequence with a length of 1151 may be mapped to 96 RBs.

Accordingly, the sequence with the length of 12 takes the frequency domain offset value of the following value: {0}.

The maximum value of the frequency domain offset value of the sequence with the length of 283 may be: 24*12−283=5. Thus, the value range of the frequency domain offset value of the sequence with the length of 283 is: {0, 1, 2, 3, 4, 5}.

The maximum value of the frequency domain offset value of the sequence with the length of 571 may be: 48×12−571=5. Thus, the value range of the frequency domain offset value of the sequence with the length of 571 is: {0, 1, 2, 3, 4, 5}.

The maximum value of the frequency domain offset value of the sequence with the length of 1151 may be: 96×12−1151=1. Thus, the value range of the frequency domain offset value of the sequence with the length of 1151 is: {0, 1}.

In an exemplary disclosure, in the case where the bandwidth is 20 MHz and the subcarrier spacing is 15 KHz, the length of the sequence may be 1151, and the frequency domain offset value is one of {0, 1}; in the case where the bandwidth is 20 MHz and the subcarrier spacing is 30 KHz, the length of the sequence may be 571, and the frequency domain offset value is one of {0, 1, 2, 3, 4, 5}; and in the case where the bandwidth is 20 MHz and the subcarrier spacing is 60 KHz, the length of the sequence may be 283, and the frequency domain offset value is one of {0, 1, 2, 3, 4, 5}.

The frequency domain offset value may be implicitly or explicitly indicated to a communication node at the other side by the communication node through control signaling.

The frequency domain offset value may also be determined by the communication node itself.

It should be noted that the precision (or referred to as unit) of the frequency domain starting position may be M1 data subcarriers, N1 RACH subcarriers, or L1 RBs; where M1, N1 and L1 are positive integers; and the precision (or referred to as unit) of the frequency domain offset value may be M2 data subcarriers, N2 RACH subcarriers, or L2 RBs; where M2, N2 and L2 are positive integers.

Embodiment Five

The number of sequences is 2. The length of the sequences may be any number less than a product of H4 and one of the number of RACH subcarriers or the number of available data subcarriers, where H4 is a positive integer, that is, the length of the sequences is different from the length of the sequence in the set of {139, 839} in the LTE technology and NR technology. For example, the length of the sequences may be 6, 12, 18, 24, 139, 283, 571, 1151, or any number less than one of the number of available data subcarriers or the number of RACH subcarriers in the system.

The lengths of the two sequences may be the same or different. In the case where the lengths of the two sequences are the same, mapping information (including the frequency domain starting position, the frequency domain offset value, or the frequency domain spacing between different sequences) in the configuration manner of the sequences is consistent with that in the embodiment one described above, which is not repeated here.

In an exemplary disclosure, in the case where the bandwidth is 20 MHz and the subcarrier spacing is 15 kHz, when the number of sequences is 2, the length of each of the sequences may be 571, and the two sequences may be mapped consecutively or non-consecutively; in the case where the bandwidth is 20 MHz and the subcarrier spacing is 15 kHz, when the number of sequences is 4, the length of each of the sequences may be 283, and the four sequences may be consecutively mapped or non-consecutively mapped; and in the case where the bandwidth is 20 MHz and the subcarrier spacing is 30 kHz, when the number of sequences is 2, the length of each of the sequences may be 283, and the two sequences may be consecutively mapped or non-consecutively mapped.

Figure 4:
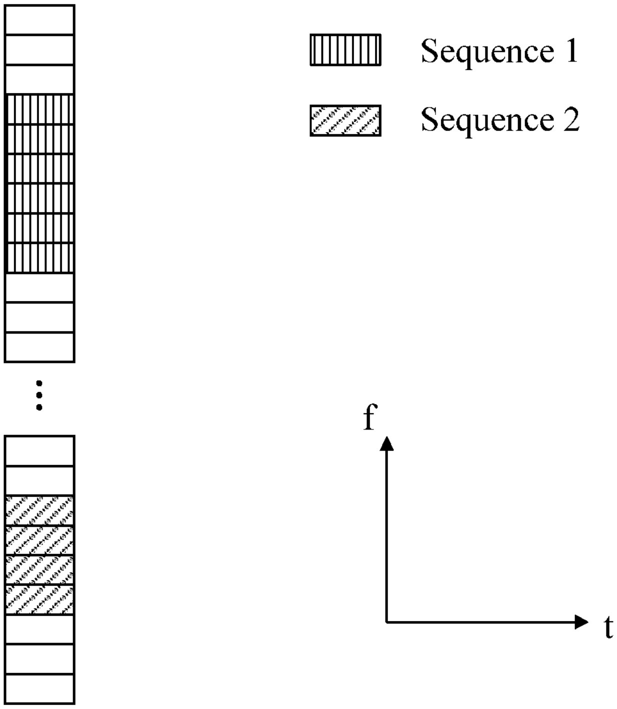
FIG. 4 is a schematic diagram of two sequences or signals having different lengths.

FIG. 4 is a schematic diagram showing two sequences with different lengths. As shown in FIG. 4, the two sequences correspond to initial sequences with different lengths. Any of the two sequences may be: an initial sequence; or a sequence obtained by rotating the phase of each element in the initial sequence by the same angle (that is, rotating an overall phase of the initial sequence by a certain angle); or a sequence obtained by rotating the phase of each element in the initial sequence by different angles. There is no phase relationship between the two sequences.

Alternatively, the length of one sequence may be 283 and the length of the other sequence may be 571.

In one possible implementation, the communication node informs, through the control signaling, a communication node at the other side of the frequency domain starting position and the frequency domain offset value of the sequence.

In an exemplary disclosure, the communication node informs, through the control signaling, another communication node of at least one of the frequency domain starting position of the sequence, the frequency domain offset value, or the frequency domain spacing between different sequences.

The precision (or referred to as unit) of the frequency domain starting position is one of H1 data subcarriers, 1/H1 data subcarrier, H1 random access channel (RACH) subcarriers, 1/H1 RACH subcarrier, H1 RBs, or 1/H1 RB; where H1 is a positive integer, and / represents division.

The precision (or referred to as unit) of the frequency domain offset value is one of H2 data subcarriers, 1/H2 data subcarrier, H2 RACH subcarriers, 1/H2 RACH subcarrier, H2 RBs, or 1/H2 RB; where H2 is a positive integer, and / represents division.

The precision (or referred to as unit) of the frequency domain spacing between the different sequences is one of H3 data subcarriers, 1/H3 data subcarrier, H3 RACH subcarriers, 1/H3 RACH subcarrier, H3 RBs, or 1/H3 RB; where H3 is a positive integer, and / represents division.

In one configuration manner of the sequences, the frequency domain starting position and the frequency domain offset value of each sequence; or, the frequency domain starting position and the frequency domain offset value of one of the sequences, and the spacing between the two sequences may also be included except at least one of the number of sequences, the length of the sequences, or the phase rotation angle of each element in each sequence.

It should be noted that frequency domain offset values of the two sequences may be the same or different. In the case where the frequency domain offset values of the two sequences are different, the configuration manner of the above sequences may further include the frequency domain offset value of the other sequence.

It should be noted that the spacing between the sequences may be a distance between starting point positions of the sequences; or a distance between final positions of the sequences; or a distance between one end of one sequence and the other end of the other sequence. The frequency domain spacing between the sequences may be determined by the communication node in the following manners: informing by the control signaling to a communicate node at the other side, or predefining a combination for the communication node at another side to select, pre-storing in the communication node at another side, or determining by the communication node itself.

Alternatively, when the length of the sequences is 283 or 571, the frequency domain offset value corresponding to each sequence is one of {0, 1, 2, 3, 4, 5}.

Embodiment Six

The number of sequences is more than one. The length of the sequences may be any number less than a product of H4 and one of the number of RACH subcarriers or the number of available data subcarriers, where H4 is a positive integer, that is, the length of the sequence is different from the length of the sequence in the set of {139, 839} in the LTE technology and NR technology. For example, the length of the sequences may be 283, 571, or 1151.

Any of the sequences may be an initial sequence; or a sequence obtained by rotating the phase of each element in the initial sequence by the same angle (that is, rotating an overall phase of the initial sequence by a certain angle); or a sequence obtained by rotating the phase of each element in the initial sequence by different angles.

The lengths of the multiple sequences may be the same or different. In the case where the lengths of the multiple sequences are the same, mapping information (such as, the frequency domain starting position, the frequency domain offset value, or the frequency domain spacing between different sequences) in the configuration manner of the sequences is consistent with those in embodiment one and embodiment three described above, which is not repeated here.

Figure 5:
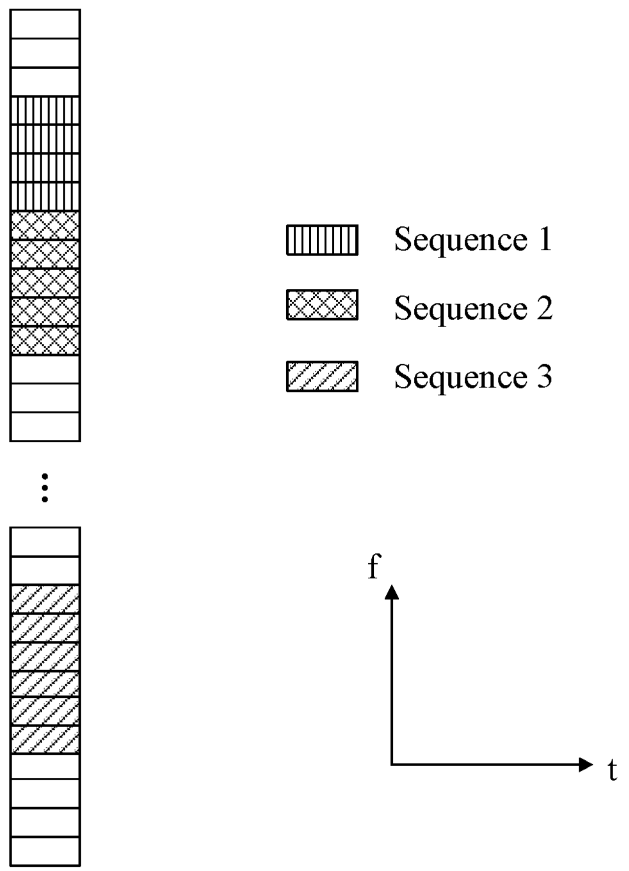
FIG. 5 is a schematic diagram of three sequences with different lengths.

FIG. 5 is a schematic diagram showing three sequences with different lengths. As shown in FIG. 5, the three sequences correspond to initial sequences with different lengths, and there is no phase relationship among the sequences.

In an exemplary embodiment, when the number of sequences is 4, the lengths of the four sequences may be four cases including 1, 2, 3 and 4 lengths.

For example, in the case where there is one length for the four sequences, the lengths of the four sequences are the same.

In the case where there are two lengths for the four sequences, the lengths of two of the four sequences are both X, and the lengths of the other two sequences are both Y; alternatively, the lengths of three sequences are each X, and the length of the other sequence is Y; where X is not equal to Y.

In the case where there are three lengths for the four sequences, the lengths of two of the four sequences are both X, the length of one of the four sequences is Y, and the length of the last one sequence is Z; where X, Y and Z are different.

In the case where there are four lengths for the four sequences, the lengths of the four sequences are different.

When the number of sequences is 8, lengths of the eight sequences may be eight cases including 1, 2, 3, 4, 5, 6, 7 and 8 lengths.

Embodiment Seven

In this embodiment, multiple bits are adopted to identify different configuration manners. According to the embodiments of the present application, the communication node may inform a communication node at the other side of all or part of contents in the configuration manners described above by adopting the control signaling.

In an exemplary embodiment, if a 2-bit identification configuration manner is adopted, "00" represents that the number of sequences used by a user equipment (UE) is 2, each sequence has the length of 283, consecutive mapping is performed, and a pi/4 phase rotation exists between the two sequences; "01" represents that the number of sequences used by the UE is 1, and the sequence has the length of 571; "10" represents that the number of sequences used by the UE is 2, each sequence has the length of 139, non-consecutive mapping is performed, and the frequency domain spacing is 25 RBs; "11" represents that the number of sequences used by the UE is 4, each sequence has the length of 283, the consecutive mapping is performed, an overall phase rotation angle of each sequence relative to the preamble sequence is: [0, pi/2, 0, pi/2], and the corresponding angles are 0, 90°, 90° and 0 in sequence.

There may be different bit correspondences for different system bandwidths.

It should be noted that the sequence described in the present application may be a random access sequence, a transmission sequence of an uplink/downlink reference signal, a sequence of a discovery signal, a synchronization signal sequence, a transmission sequence of an uplink control channel or a measurement signal, a transmission sequence of a downlink control channel, other signal transmissions, or the like.

Embodiment Eight

According to the embodiments of the present application, different configuration combinations may be adopted to realize the balance the system performance and the control information load.

Alternative embodiments for the precision of rotation of an angle are as follows.

A new sequence is composed of two initial sequences, and an overall phase relationship exists between the two sequences, so that four points with relatively good phase values are provided, that is, [0, 90°, 180°, 270° ], respectively.

Embodiments of the present application may be configured in the following two manners.

A configuration manner one: '1' represents that a 0° phase relationship exists between the two sequences; and '0' represents that a 180° phase relationship exists between the two sequences.

A configuration manner two: '00' represents that a 0° phase relationship exists between the two sequences; '01' represents that a 90° phase relationship exists between the two sequences; '10' represents that a 180° phase relationship exists between the two sequences; and '11' represents that a 270° phase relationship exists between the two sequences.

In the system configuration, the configuration manner one may be selected for the case where the system has a low requirement for the phase precision or the system load is relatively large or other conditions; while the configuration manner two may be selected for the case where the system has a high requirement for the phase precision or the system load is relatively small or other conditions.

Figure 6:
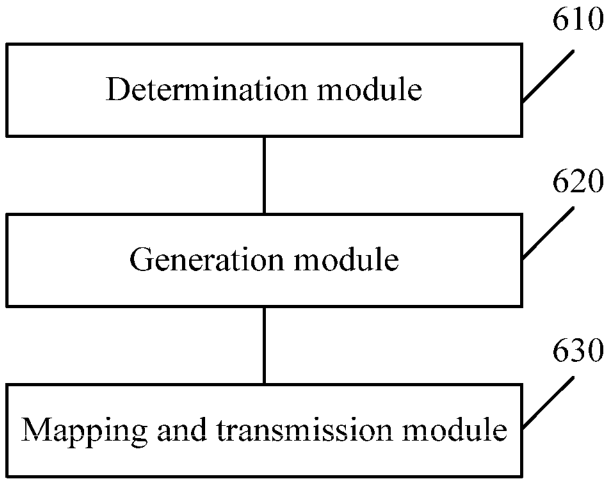
FIG. 6 is a schematic structural diagram of a signal transmission device according to an embodiment of the present application.

An embodiment of the present application further provides a signal transmission device, and FIG. 6 is a schematic structural diagram of a signal transmission device according to an embodiment of the present application, and the signal transmission device includes a determination module 610, a generation module 620 and a mapping and transmission module 630. The determination module 610 is configured to determine a configuration manner of sequences, where the configuration manner includes at least one of the number of the sequences, the length of the sequences, or a phase rotation angle of an element in the sequences. The generation module 620 is configured to generate the sequences according to the configuration manner. The mapping and transmission module 630 is configured to map the sequences to channel resources and transmit the mapped sequences.

In one embodiment, the configuration further includes at least one of a frequency domain starting position, a frequency domain offset value, or a frequency domain spacing between different sequences; the mapping and transmission module 630 is configured to map the sequences to the channel resources according to the at least one of the frequency domain starting position, the frequency domain offset value, or the frequency domain spacing between the different sequences.

It should be noted that the random access sequences are different in length and may correspond to different mapping rules or the same mapping rule (including the frequency domain starting position, the frequency domain offset value, or the frequency domain spacing between different random access sequences). For multiple random access sequences, there may be a certain phase relationship between random access sequences.

Functions of each module in each device of the embodiments of the present application may be found in the corresponding description in the above method embodiments and are not described in detail herein.

Figure 7:
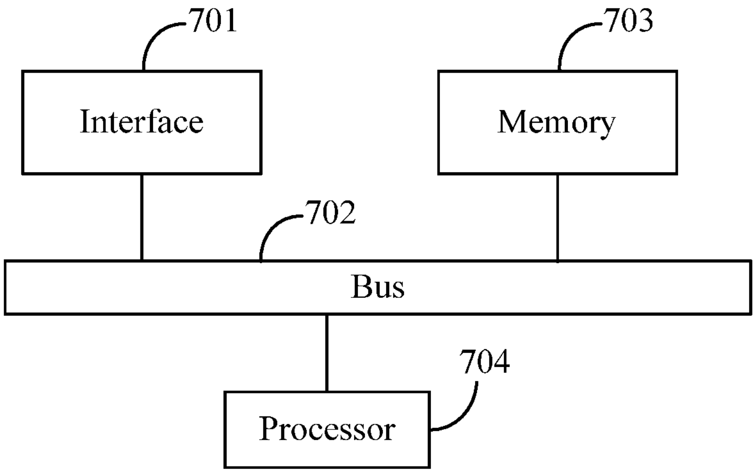
FIG. 7 is a schematic structural diagram of a communication node for a signal transmission according to an embodiment of the present application.

FIG. 7 is a schematic structural diagram of a communication node for a signal transmission according to an embodiment of the present application, as shown in FIG. 7, and the communication node 70 provided in an embodiment of the present disclosure includes a memory 703 and a processor 704. The communication node 70 may further include an interface 701 and a bus 702. The interface 701, the memory 703 and the processor 704 are connected through the bus 702. The memory 703 is configured to store an instruction. The processor 704 is configured to read the instruction to execute the above described technical scheme of the method embodiment applied to the communication node, the implementation principles and technical effects of the processor 704 are similar, which are not repeated here.

The present application provides a storage medium, the storage medium stores a computer program, and when the computer program is executed by a processor, the method in the embodiments described above is implemented.

As will be apparent to those skilled in the art, embodiments of the present application may be provided as a method, a system, or a computer program product. Therefore, the present application may take a form of a hardware embodiment, a software embodiment, or an embodiment combining software and hardware aspects. Furthermore, the present application may take a form of a computer program product embodied on one or more computer usable storage media (including but not limited to a disk storage, an optical storage, and the like) having a computer usable program code embodied therein.

The present application is described with reference to flowcharts and/or block diagrams of the method, the apparatus (system), and the computer program product according to the embodiments of the present application. It should be understood that each flow and/or block in the flowcharts and/or block diagrams, and combinations of flows and/or blocks in the flowcharts and/or block diagrams, may be implemented by computer program instructions. These computer program instructions may be provided to a processor of a general purpose computer, special purpose computer, embedded processing machine, or other programmable data processing apparatus to produce a machine, so that an instruction executed by a processor of a computer or other programmable data processing apparatus generates a device for implementing functions specified in one flow or multiple flows in the flowchart and/or in one block or multiple blocks in the block diagrams.

These computer program instructions may also be stored in a computer-readable memory that can direct a computer or other programmable data processing apparatus to function in a particular manner, so that an instruction stored in the computer-readable memory generates an article of manufacture including an instruction device, the instruction device implements functions specified in one flow or multiple flows in the flowchart and/or in one block or multiple blocks in the block diagrams.

These computer program instructions may also be loaded onto a computer or other programmable data processing apparatus to cause a series of operations to be performed on the computer or other programmable apparatus so that the computer-implemented processing is generated, therefore, an instruction executed on the computer or other programmable apparatus provides operations for implementing functions specified in one flow or multiple flows in the flowchart and/or in one block or multiple blocks in the block diagrams.

What is claimed is:

1. A signal transmission method, performed by a first communication node, comprising:

determining a configuration manner of at least one sequence, wherein the configuration manner comprises a length of the at least one sequence, a frequency domain offset value, and a number of the at least one sequence;

generating the at least one sequence according to the configuration manner; and mapping the at least one sequence to channel resources and transmitting the at least one mapped sequence to a second communication node; wherein the channel resources comprise frequency domain resources;

wherein the length of the at least one sequence is 571, and the frequency domain offset value is 2; or, the length of the at least one sequence is 1151, and the frequency domain offset value is 1;

wherein the configuration manner further comprises at least one of a frequency domain starting position or a frequency domain spacing between different sequences of the at least one sequence;

in response to the at least one sequence comprising more than one sequence, the configuration manner further comprises:

a frequency domain starting position of a first sequence of the more than one sequence and a frequency domain offset value of each of the more than one sequence; and one of frequency domain starting positions of other sequences except the first sequence, frequency domain spacings of other sequences except the first sequence relative to the first sequence, or frequency domain spacings between a specified sequence and other sequences except the first sequence;

wherein mapping the at least one sequence to the channel resources further comprises: mapping the at least one sequence to the channel resources according to the at least one of the frequency domain starting position or the frequency domain spacing between the different sequences; and wherein a precision of the frequency domain starting position is one of H1 data subcarriers, 1/H1 data subcarrier, H1 RACH subcarriers, 1/H1 RACH subcarrier, H1 RBs, or 1/H1 RB; wherein H1 is a positive integer, and/represents division;

a precision of the frequency domain offset value is one of H2 data subcarriers, 1/H2 data subcarrier, H2 RACH subcarriers, 1/H2 RACH subcarrier, H2 RBs, or 1/H2 RB; wherein H2 is a positive integer, and/represents division; or a precision of the frequency domain spacing between the different sequences is one of H3 data subcarriers, 1/H3 data subcarrier, H3 RACH subcarriers, 1/H3 RACH subcarrier, H3 RBs, or 1/H3 RB; wherein H3 is a positive integer, and/represents division.

2. The method of claim 1, wherein mapping the at least one sequence to the channel resources further comprises:

mapping the at least one sequence to all or part of frequency domain resources of any interlace of the channel resources; or mapping the at least one sequence to all or part of frequency domain resources of a plurality of interlaces of the channel resources;

wherein the frequency domain resources are M1 data subcarriers, 1/M1 data subcarrier, M1 random access channel (RACH) subcarriers, 1/M1 RACH subcarrier, M1 resource blocks (RBs), or 1/M1 RB; wherein M1 is a positive integer, and/represents division.

3. The method of claim 1, wherein any item in the configuration manner is determined in at least one of the following manners: informing by control signaling, predefining a combination for a communication node to select, pre-storing in a communication node and triggering by control signaling, informing by a control channel, or configuring by a higher layer.

4. The method of claim 1, wherein the more than one sequence corresponds to a same initial sequence, or different sequences of the more than one sequence correspond to different initial sequences.

5. The method of claim 1, wherein the configuration manner further comprises a phase rotation angle of an element in the at least one sequence, the configuration manner comprises:

the number of the at least one sequence being 1; and the phase rotation angle of the element in the one sequence; wherein phase rotation angles of a plurality of elements are the same or different.

6. The method of claim 1, wherein the configuration manner further comprises a phase rotation angle of an element in the at least one sequence, the configuration manner comprises:

the number of the at least one sequence being more than one; and the phase rotation angle of the element in the sequences; wherein phase rotation angles of a plurality of elements in a same sequence are the same or different; and phase rotation angles of elements in different sequences are the same or different.

7. The method of claim 1, wherein in response to the at least one sequence comprising two sequences, the configuration manner further comprises:

the frequency domain starting position of the first sequence of the two sequences and the frequency domain offset value of each of the two sequences; and a frequency domain spacing between the two sequences, or a frequency domain starting position of a second sequence of the two sequences.

8. The method of claim 1, wherein the configuration manner further comprises:

the frequency domain starting position of the first sequence of the more than one sequence and the frequency domain offset value of each of the more than one sequence; and a frequency domain spacing between adjacent ones of the more than one sequence.

9. The method of claim 1, wherein the configuration manner further comprises:

a frequency domain starting position of each of the more than one sequence and a frequency domain offset value of each of the more than one sequence.

10. The method of claim 1, wherein the configuration manner further comprises:

lengths of the more than one sequence are the same or different.

11. The method of claim 1, wherein the configuration manner further comprises a phase rotation angle of an element in the at least one sequence, and the phase rotation angle of the element in the at least one sequence comprises at least one of following:

an overall phase relationship among multiple sequences;

a phase relationship between elements within each sequence;

an overall phase relationship of each sequence relative to the initial sequence, the first sequence or an adjacent sequence;

a phase relationship of each element within each sequence relative to a respective element of the initial sequence.

12. A first communication node for a signal transmission, comprising a processor and a memory;

wherein the memory is configured to store an instruction; and the processor is configured to read the instruction to perform:

determining a configuration manner of at least one sequence, wherein the configuration manner comprises a length of the at least one sequence, a frequency domain offset value, and a number of the at least one sequence;

generating the at least one sequence according to the configuration manner; and mapping the at least one sequence to channel resources and transmitting the at least one mapped sequence to a second communication node; wherein the channel resources comprise frequency domain resources;

wherein the length of the at least one sequence is 571, and the frequency domain offset value is 2; or, the length of the at least one sequence is 1151, and the frequency domain offset value is 1;

wherein the configuration manner further comprises at least one of a frequency domain starting position or a frequency domain spacing between different sequences of the at least one sequence;

in response to the at least one sequence comprising more than one sequence, the configuration manner further comprises:

a frequency domain starting position of a first sequence of the more than one sequence and a frequency domain offset value of each of the more than one sequence; and one of frequency domain starting positions of other sequences except the first sequence, frequency domain spacings of other sequences except the first sequence relative to the first sequence, or frequency domain spacings between a specified sequence and other sequences except the first sequence;

wherein the processor is further configured to read the instruction to perform:

mapping the at least one sequence to the channel resources according to the at least one of the frequency domain starting position or the frequency domain spacing between the different sequences; and wherein a precision of the frequency domain starting position is one of H1 data subcarriers, 1/H1 data subcarrier, H1 RACH subcarriers, 1/H1 RACH subcarrier, H1 RBs, or 1/H1 RB; wherein H1 is a positive integer, and/represents division;

a precision of the frequency domain offset value is one of H2 data subcarriers, 1/H2 data subcarrier, H2 RACH subcarriers, 1/H2 RACH subcarrier, H2 RBs, or 1/H2 RB; wherein H2 is a positive integer, and/represents division; or a precision of the frequency domain spacing between the different sequences is one of H3 data subcarriers, 1/H3 data subcarrier, H3 RACH subcarriers, 1/H3 RACH subcarrier, H3 RBs, or 1/H3 RB; wherein H3 is a positive integer, and/represents division.

13. The first communication node of claim 12, the processor is further configured to read the instruction to perform:

mapping the at least one sequence to all or part of frequency domain resources of any interlace of the channel resources; or mapping the at least one sequence to all or part of frequency domain resources of a plurality of interlaces of the channel resources;

wherein the frequency domain resources are M1 data subcarriers, 1/M1 data subcarrier, M1 random access channel (RACH) subcarriers, 1/M1 RACH subcarrier, M1 resource blocks (RBs), or 1/M1 RB; wherein M1 is a positive integer, and/represents division.

14. The first communication node of claim 12, wherein any item in the configuration manner is determined in at least one of the following manners: informing by control signaling, predefining a combination for a communication node to select, pre-storing in a communication node and triggering by control signaling, informing by a control channel, or configuring by a higher layer.

15. A non-transitory computer-readable storage medium storing a computer program, wherein the computer program, when executed by a processor, implements the signal transmission method of claim 1.

* * * * *